United States Patent
Peng et al.

(10) Patent No.: US 9,337,930 B2
(45) Date of Patent: May 10, 2016

(54) COMPACT SMALL FORM-FACTOR PLUGGABLE TRANSCEIVER

(71) Applicants: Liang-Ping Peng, Santa Clara, CA (US);
Norman Tang, Los Altos, CA (US);
David Lai, Mountain View, CA (US)

(72) Inventors: Liang-Ping Peng, Santa Clara, CA (US);
Norman Tang, Los Altos, CA (US);
David Lai, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/246,562

(22) Filed: Apr. 7, 2014

(65) Prior Publication Data
US 2014/0219652 A1    Aug. 7, 2014

Related U.S. Application Data

(63) Continuation of application No. 12/925,096, filed on Oct. 12, 2010, now Pat. No. 8,708,578.

(51) Int. Cl.
| | |
|---|---|
| *H04J 14/00* | (2006.01) |
| *G02B 6/36* | (2006.01) |
| *H04B 10/2581* | (2013.01) |
| *H04B 10/40* | (2013.01) |

(52) U.S. Cl.
CPC ............ *H04B 10/2581* (2013.01); *H04B 10/40* (2013.01)

(58) Field of Classification Search
USPC ......................................................... 385/92
See application file for complete search history.

(56) References Cited

U.S. PATENT DOCUMENTS

| | | |
|---|---|---|
| 7,360,954 B1 | 4/2008 | Seaver et al. |
| 2004/0008953 A1 | 1/2004 | Ito et al. |
| 2004/0175077 A1 | 9/2004 | Weber |
| 2007/0133987 A1* | 6/2007 | Xu et al. .................. 398/67 |
| 2008/0267620 A1 | 10/2008 | Cole et al. |
| 2009/0148155 A1 | 6/2009 | Latchman |
| 2009/0185498 A1 | 7/2009 | Astigarraga et al. |
| 2010/0325432 A1 | 12/2010 | Tang et al. |
| 2011/0136443 A1 | 6/2011 | Milenkovic et al. |

OTHER PUBLICATIONS

"Compact SFP Specifications," Revision 2.0, dated Oct. 16, 2009.
"SFP Copper Transceiver," (1000BASE-T SFP Copper Transceiver) *Shenzhen Greatway Technology Co., Ltd.*
"Cooperation Agreement for Small Form-Factor Pluggable Transceivers," downloaded from http://www.schelto.com/SFP/SFP%20MSA%20091400.htm, Downloaded Oct. 12, 2010.

(Continued)

*Primary Examiner* — Eric Wong
(74) *Attorney, Agent, or Firm* — Baker Botts L.L.P.

(57) ABSTRACT

An apparatus, in accordance with particular embodiments, includes an interface configured to establish connections within a copper network. The apparatus also includes a receptacle configured to receive a conventional small form-factor pluggable (SFP) module or a compact SFP module and to direct the SFP modules to a first connector. The first connector connects either of the SFP modules to the node. A pin of the first connector is configured to receive a module detection signal and to transmit data to the compact SFP module. The apparatus also includes a low pass filter coupled to the pin of the first connector that passes the module detection signal to the node. The apparatus is further configured to establish two duplex connections with an optical fiber network if the compact SFP module is connected and to establish one duplex connection with the optical fiber network if the conventional SFP module is connected.

9 Claims, 2 Drawing Sheets

(56) References Cited

OTHER PUBLICATIONS

PCT, "Invitation to Pay Additional Fees and, Where Applicable, Protest Fee," (PCT Article 17(3)(a) and Rule 40.1 and 40.2(e)), Mailed Dec. 30, 2011, International Application No. PCT/US2011/055547, 7 pages, Mailed Dec. 30, 2011.

PCT Notification of Transmittal of the International Search Report and the Written Opinion of the International Searching Authority for International Application No. PCT/US2011/055547; 17 pages, Mar. 7, 2012.

State Intellectual Property Office of the People's Republic of china, The First Office Action, Appln. No. 201180049032.5, issued Feb. 28, 2015 (English and Chinese versions).

State Intellectual Property Office of the People's Republic of China, The Second Office Action, Appln. No. 201180049032.5 issued Oct. 26, 2015 (English and Chinese versions).

\* cited by examiner

| PIN | PIN ASSIGNMENT |
|---|---|
| 1 | Vee |
| 2 | TX_Fault |
| 3 | TX1_Disable |
| 4 | MOD-DEF2 |
| 5 | MOD-DEF1 |
| 6 | MOD-DEF0 / TD2- |
| 7 | TD2+ |
| 8 | LOS 1 |
| 9 | RD2+ |
| 10 | RD2- |
| 11 | Vee |
| 12 | RD1- |
| 13 | RD1+ |
| 14 | LOS 2 |
| 15 | Vcc R |
| 16 | Vcc T |
| 17 | TX2_Disable |
| 18 | TD1+ |
| 19 | TD1- |
| 20 | Vee |

COMPACT SMALL FORM-FACTOR PLUGGABLE TRANSCEIVER

RELATED APPLICATIONS

This application is a continuation of U.S. application Ser. No. 12/925,096 filed Oct. 12, 2010 entitled "Compact Small form-Factor Pluggable Transceiver".

TECHNICAL FIELD

The present disclosure relates generally to compact small form-factor pluggable (SFP) transceivers.

BACKGROUND

Conventional SFP modules and traditional compact SFP modules (e.g., compact SFP modules conforming to the multi-source agreement (MSA) draft standard) are transceivers used to connect between fiber optic and copper networks. Both SFP modules are designed to connect to a host device having a standardized receptacle. Once inserted within the receptacle of a host in a copper network, the host is able to establish fiber optic connections via the compact SFP module. Depending on the application, the SFP modules may support one or more standards such as SONET, SDH, Ethernet, Gigabit Ethernet, Fibre Channel, and other communications standards. Traditional compact SFP modules are dual channel. Thus, each compact SFP added to a host potentially provides the host with two duplexed fiber optic connections. This was an improvement over conventional SFP modules which only allowed a single duplexed fiber optic connection. While a conventional SFP module and a traditional compact SFP module may physically fit within the same receptacle and form a twenty-pin connection, the pinout and design used for traditional compact SFP modules does not allow for backwards compatibility with older conventional SFP modules.

BRIEF DESCRIPTION OF THE FIGURES

For a more complete understanding of particular embodiments and their advantages, reference is now made to the following description, taken in conjunction with the accompanying drawings, in which.

DESCRIPTION

Overview

The teachings of the present disclosure relate to an apparatus that includes at least one interface configured to establish a connection between a node and at least one other node of a copper network. The apparatus also includes a receptacle configured to receive a conventional small form-factor pluggable (SFP) module or a compact SFP module. The receptacle is able to direct either SFP module to a first connector. The first connector is configured to connect the conventional SFP module or the compact SFP module to the node. A pin of the first connector is configured to receive a module detection signal and to transmit data to the compact SFP module. The apparatus also includes a low pass filter coupled to the pin of the first connector. The low pass filter is configured to pass the module detection signal to the node. The node of the apparatus is configured to establish two duplex connections with an optical fiber network if the compact SFP module is connected to the node and to establish one duplex connection with the optical fiber network if the conventional SFP module is connected to the node.

DESCRIPTION OF EXAMPLE EMBODIMENTS

Figure 1:
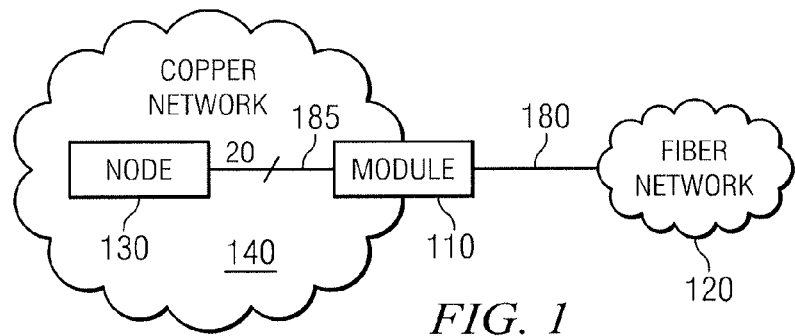
FIG. 1 is a block diagram illustrating a compact SFP module positioned between a fiber optic network and a copper network, in accordance with particular embodiments.

FIG. 1 is a block diagram illustrating a compact SFP module positioned between a fiber optic network and a copper network, in accordance with particular embodiments. In the depicted embodiment, compact SFP module 110 is coupled to fiber network 120 via fiber connection 180. Compact SFP module 110 is also coupled to node 130 via twenty-pin connector 185. Node 130 may be a host device within copper network 140. The components and functional location of compact SFP module 110 allow fiber network 120 to be connected to copper network 140 via node 130. Copper network 140 is not limited to simply to networks using copper wire, but includes any network using any type of wire able to carry electric current.

Compact SFP module 110 may be configured to be inserted into a corresponding receptacle in node 130. The receptacle may be of a standard size, allowing it to receive compact SFP module 110 and conventional SFP modules. The physical geometry of compact SFP module 110 may be such that compact SFP module 110 may slide or otherwise fit within the receptacle of node 130. In certain embodiments, inserting compact SFP module 110 into the receptacle results in a connection between the corresponding portions of twenty-pin connector 185. In certain embodiments, compact SFP module 110 may comprise a portion of twenty-pin connector 185. Compact SFP module 110's portion of twenty-pin connector 185 may be physically similar to the portion of twenty-pin connector used for other SFP modules. This may allow compact SFP module 110 to be inserted into a node configured for use with compact SFP modules or for use with conventional SFP modules. Conversely, node 130's portion of twenty-pin connector 185 may be used with compact SFP module 110 or conventional SFP modules. Compact SFP module 110 may be one of many compact SFP modules coupled to node 130. In certain embodiments, inserting compact SFP module 110 into a node configured for use with conventional SFP modules may result in compact SFP module 110 being able to establish only a single optical connection. Similarly, adding a conventional SFP module to a node configured to use compact SFP module 110 may limit the node to only a single optical connection.

In some embodiments, compact SFP module 110 may comprise two interfaces for two duplex fiber connections. Compact SFP module 110 may receive data via the fiber connections and transform the data into electrical signals for node 130. The electrical signals may be sent to node 130 via twenty-pin connector 185 for routing and/or distribution within copper network 140. Similarly, compact SFP module 110 may receive electrical signals from node 130 via twenty-pin connector 185. The electrical signals may be transformed to optical signals by compact SFP module 110 and sent to fiber network 120 via optical connection 180.

Node 130 may be a switch, router, gateway, hub, or any other network device configured to send and receive data. In certain embodiments, node 130 may comprise one or more interfaces for transmitting and receiving data and/or signals within copper network 140. Node 130 may comprise a receptacle configured to receive compact SFP module 110 or a conventional SFP module. The receptacle may direct compact SFP module 110 towards node 130's portion of twenty-pin connector 185. The node portion of twenty-pin connector 185 may be backwards compatible with the twenty-pin connector of a conventional SFP module.

In particular embodiments, node 130 may comprise circuitry (see FIG. 2), such as a low-pass filter, that allows a single pin to be used to transmit and/or receive two different signals. For example, the same pin used for module detection may also be used for transmitting high-speed data from node 130 to compact SFP module 110. In some embodiments, the pin used for the two signals may be pin 6. When pin 6 is used with a conventional SFP module, it is only used for module detection.

Fiber network 120 may comprise any number of devices and connections used to support any of a variety of protocols and features. For example, fiber network 120 may comprise one or more SONET, SDH, or Fibre Channel networks. Copper network 140 may comprise any number of devices and connections used to support any of a variety of protocols and features. For example, copper network 140 may comprise one or more Ethernet or Gigabit Ethernet networks. The term "network" should be interpreted as generally defining any interconnection of components capable of transmitting audio and/or video communication signals, data, and/or messages, including signals, data or messages transmitted through streaming media, text chat, instant messaging and e-mail. A network may be implemented as, or be connected to one or more of, a local area network (LAN), a wide area network (WAN), a public switched telephone network (PSTN), a global distributed network (e.g., the Internet), an intranet, an extranet, or any other form of wireless or wireline communication network. A network may be a combination of one or more network types, such as those listed above. Any network components capable of exchanging audio, video, or other data using frames or packets are included within the scope of particular embodiments.

As discussed above, both compact SFP module 110 and node 130 comprise portions of twenty-pin connector 185. These two portions may comprise corresponding portions (e.g., male and female portions) that form the twenty-pin connection between compact SFP module 110 and node 130. In certain embodiments, twenty-pin connector 185 may comprise a pin-out (see FIG. 3) in which one of the pins is used by node 130 to both transmit high-speed data to compact SFP module 110 and to detect the presence of compact SFP module 110 (or a conventional SFP module).

Figure 2:
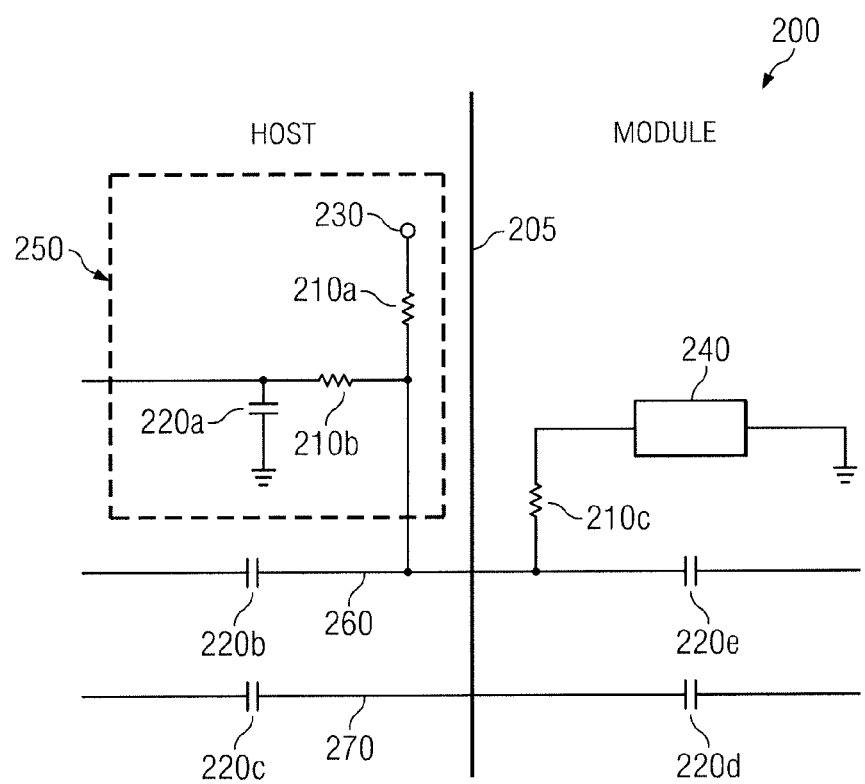
FIG. 2 is a circuit diagram illustrating the circuitry for two pins of a compact SFP module and a host device, in accordance with particular embodiments.

FIG. 2 is a circuit diagram illustrating the circuitry for two pins of a compact SFP module and a host device, in accordance with particular embodiments. Circuit 200 comprises pins 260 and 270 coupled to resistors 210, capacitors 220, power supply 230, ferrite bead 240, and low-pass filter 250. Circuit 200 has been divided into a host side (to the left of vertical line 205) corresponding to node 130 of FIG. 1, and a module side (to the right of vertical line 205) corresponding to module 110 of FIG. 1. Vertical line 205 may mark where circuit 200 splits when the module is removed from the host node. In the depicted embodiment, pin 260 corresponds to pin 6 in FIG. 3 and pin 270 corresponds to pin 7 in FIG. 3.

Low pass filter 250 may pass low frequency signals (e.g., frequencies less than 100 Hz or frequencies less than 20 Hz). The low frequency signal passed by low pass filter 250 may be used to indicate the presence of a module connected to the host. Low pass filter 250 comprises resistors 210a and 210b, power supply 230, and capacitor 220a. The values of these components may vary depending on operational parameters. For example, depending on the embodiment, resistor 210a may have a resistance of between approximately 4,700 and 10,000 ohms, resistor 210b may have a resistance of between approximately 9,000 and 11,000 ohms, power supply 230 may have a voltage of between approximately 3.13 and 3.47 volts, and capacitor 220a may have a capacitance of between approximately 0.1 and 0.2 micro farads. In some embodiments, resistor 210a may have a resistance of approximately 4,700 ohms, resistor 210b may have a resistance of approximately 10,000 ohms, power supply 230 may have a voltage of approximately 3.3 volts, and capacitor 220a may have a capacitance of 0.1 micro farads. In some embodiments, the values may be selected such that a high-speed transmit signal on pin 260 is not passed and such that the R/C constant (e.g., (the resistance of resistor 210b)*(the capacitance of capacitor 220a) is short enough to allow for the quick detection of the presence of an SFP module on line 280. In certain embodiments, the values may be set so as to provide isolation between the data passed on pin 260 and the host module presence detection signal on line 280.

In addition to low pass filter 250, the host side of circuit 200 may comprise capacitors 220b (coupled to pin 260) and 220c (coupled to pin 270). The values of capacitors 220b and 220c may vary depending on operational parameters. For example, depending on the embodiment, capacitor 220b may have a capacitance of between approximately 0.1 and 0.2 micro farads, and capacitor 220c may have a capacitance of between approximately 0.1 and 1 micro farads. On the module side of circuit 200 there may be another two capacitors, capacitors 220d (coupled to pine 270) and 220e (coupled to pin 260). The values of capacitors 220d and 220e may vary depending on operational parameters. For example, depending on the embodiment, capacitor 220d may have a capacitance of between approximately 0.1 and 1 micro farads, and capacitor 220e may have a capacitance of between approximately 0.1 and 1 micro farads. In general, capacitors 220b-220e may aid in balancing the voltage on pins 260 and 270. In certain embodiments, capacitors 220b-220e may each have a capacitance of approximately 0.1 micro farads. In some embodiments, the capacitance of capacitors 220b-220e may be large enough to allow a high-speed signal on pin 260 and small enough that the parasitic inductance is small for high-speed data. In some embodiments, capacitors 220b-220e may be physically small enough to be placed on a transmission line. In certain embodiments, capacitors 220e and 220d may have approximately the same capacitance, similarly capacitors 220b and 220c may have approximately the same capacitance. This may improve the differential balance. In the depicted embodiments, capacitors 220b and 220e may be DC blocking capacitors.

In addition to capacitors 220c and 220d, the module side of circuit 200 may comprise ferrite bead 240 and resistor 210c. The value of resistor 210c may vary depending on operational parameters. For example, depending on the embodiment, resistor 210c may have a resistance of between approximately 500 and 550 ohms. In some embodiments, resistor 210c may have a resistance of approximately 511 ohms. In some embodiments, resistor 210c may be at least 10 times bigger than the transmission line impedance (e.g., 50 ohms) to minimize impedance change on pin 260. In some embodiments, resistor 210c may be one-tenth the resistance of resistor 210a to ensure the voltage is within LVTTL low level (0.8V) (e.g., about 0.3 volts).

In some situations, the values of resistors 210a and 210c may be dependent on one another along with the value of power supply 230. That is, resistors 210a and 210c form a voltage divider for power supply 230. Adjusting the value of any one of resistor 210a, resistor 210c, or power supply 230 may impact the resulting voltage (resulting voltage=[Voltage of power supply]*([resistor 210c]/([resistor 210a]+[resistor 210c]))). In particular embodiments, the values of resistor 210a, resistor 210c, and power supply 230 may be set so that the resulting voltage is approximately 0.324 volts.

Figures 3, 4:
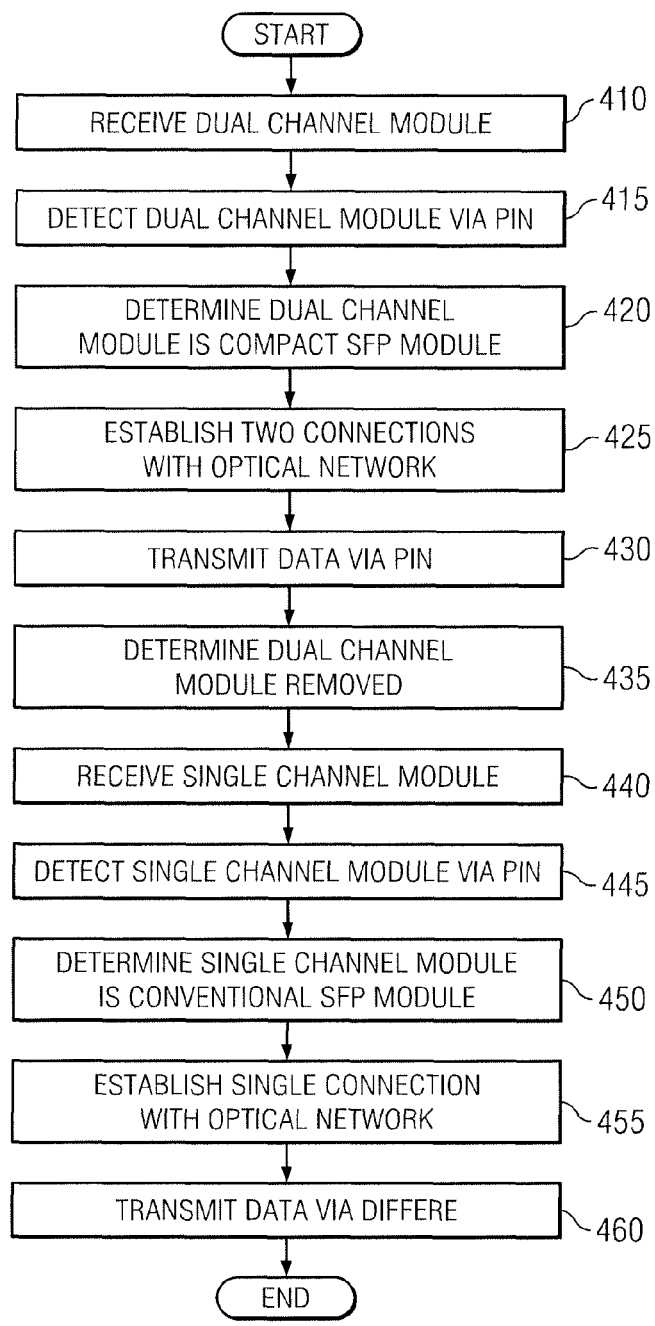
FIG. 3 is a chart illustrating the pin assignment for a compact SFP module and host receptacle, in accordance with particular embodiments.
FIG. 4 is a flowchart illustrating a method of using a compact SFP module, in accordance with particular embodiments.

FIG. 3 is a chart illustrating the pin assignment for a compact SFP module and receptacle, in accordance with particular embodiments. In the depicted embodiment, pins 1-6, 8, 11-13, 15-16, and 18-20 may have the same signal as in a conventional SFP pin assignment, and pins 6-7, 9-10, 14, and 17 may be used in providing a second high-speed data channel. This allows for compatibility with conventional SFP modules, which are single channel modules, and compact SFP modules such as compact SFP module 110, which may be dual channel modules. Because pin 6 is used to both transmit data from a host device to a module, and to detect the presence of a module it may be possible to have backwards compatibility while also providing a second high-speed data channel. This may be done without requiring a change in the number of pins.

FIG. 4 is a flowchart illustrating a method of using a compact SFP module, in accordance with particular embodiments. For purposes of this method it may be assumed that a node has established one or more connections with various components of a copper network (similar to copper network 140). The method begins at step 410 by receiving a dual channel module. The dual channel module may be received by the node via a receptacle configured to receive the dual channel module as well as single channel modules.

Once the dual channel module has been received, the node may detect the presence of the module at step 415 via a single pin. In particular embodiments the single pin may be pin number six of a twenty-pin connector. In certain embodiments, a low pass filter may be coupled to the sixth pin. The low pas filter may pass a low frequency signal that is used detect the presence of a module (whether single channel or dual channel). In some embodiments, the signal passed by the low pass filter is a reverse logic signal (e.g., a low signal indicates that a module is present, and a high signal indicates that a module is not present).

At step 420 the node determines that the dual channel module is a compact SFP module. This determination indicates that the node can establish at least two duplex optical connections with an optical network (similar to optical network 120) via the compact SFP module.

At step 425 the node establishes two fiber optic connections with the optical network via the compact SFP module. In certain instances it may not be necessary for the node to establish two connections with the optical network. For example, in some situations, the node may only need one connection to the optical network or the optical fiber used for one of the connections may be damaged or missing.

At step 430 the node transmits data via two pins as a differential signal, one of the pins being the single pin. This single pin may be the same pin that was used to detect the presence of the dual channel module at step 415. In some embodiments, the pin may be used to transmit data associated with only one of the two connections established with the optical network.

At step 435 the node determines that the dual channel module has been removed. This may be determined when the signal from the low pass filter goes high, indicating that no SFP module is present.

At step 440 a single channel module is received. The single channel module may be received via the same receptacle used to receive the dual channel module at step 410. Then, at step 445 the node detects the single channel module via the same single pin used to detect the dual channel module at step 415.

At step 450, after detecting the presence of the single channel module, the node may determine that the single channel module is a conventional SFP module. This may indicate that the node may be able to establish only one optical connection with the optical network. In some embodiments, the node may be configured to ignore, or otherwise not use, a conventional SFP module that has been received by the receptacle.

At step 455 the node establishes a single connection with the optical network. The data sent from the node via the single connection may be sent via a different pin than the pin used to detect the presence of the conventional SFP module. That is, pin 6, used to detect SFP modules, may not be used to transmit data via a conventional SFP module. This provides backwards compatibility between the node and conventional SFP modules.

Some of the steps illustrated in FIG. 4 may be combined, modified or deleted where appropriate, and additional steps may also be added to the flowchart. Additionally, steps may be performed in any suitable order without departing from the scope of particular embodiments. For example, if a user is upgrading from a conventional SFP module to the compact SFP module, then steps 410-430 may switch with steps 440-460. That is, the conventional SFP module be removed and the node then detects the compact SFP module once the user inserts it into the node.

Technical advantages of particular embodiments may include allowing for a host device, such as node 130, to be able to receive both SFP modules and compact SFP modules in the same receptacle. Other technical advantages will be readily apparent to one of ordinary skill in the art from the figures, descriptions, and claims provided herein. Moreover, while specific advantages have been enumerated above, various embodiments may include all, some, or none of the enumerated advantages.

Thus far, several different embodiments and features have been presented. Particular embodiments may combine one or more features depending on operational needs and/or component limitations. This may allow for great adaptability to the needs of various organizations and users. Some embodiments may include additional features. Moreover, it should be understood that various other changes, substitutions, combinations and alterations may be made hereto without departing from the spirit and scope of the disclosure. For example, although an embodiment has been described with reference to a single pin being used for both device detection and data transfer, other embodiments may combine other signals on other pins. For example, the device detection signal may share pin 6 with incoming high-speed data signal. As another example, particular embodiments may use modules other than SFP modules. In addition, any of the elements depicted herein may be provided as integrated internal or separate external components to each other where appropriate. Particular embodiments contemplate great flexibility in the arrangement of these elements as well as their internal components. Numerous other changes, substitutions, variations, alterations and modifications may be ascertained by those skilled in the art and it is intended that particular embodi-

What is claimed is:

1. An apparatus comprising:
 a receptacle formed to receive either a conventional single-channel small form-factor pluggable (SFP) module or a compact dual-channel SFP module and to direct a received SFP module toward a first connector;
 wherein the first connector comprises twenty pins, and a sixth pin of the twenty pins is coupled to a first line and a second line, the first line being in parallel with the second line and having a filter coupled thereto.

2. The apparatus of claim 1, further comprising:
 a first interface coupled to a first node in a copper network using a twelfth pin, a thirteenth pin, an eighteenth pin, and a nineteenth pin of the twenty pins; and
 a second interface coupled to a second node in the copper network using the sixth pin, a seventh pin, a ninth pin, and a tenth pin of the twenty pins.

3. The apparatus of claim 1, wherein the filter comprises a low pass filter.

4. A method comprising:
 receiving, from a dual-channel SFP module at a sixth pin of a first connector comprising twenty pins, a module detection signal and a first data signal;
 transmitting the first data signal and the module detection signal to a filter; and
 by the filter, passing the module detection signal to a first line and blocking the data signal.

5. The method of claim 4, further comprising:
 establishing a first connection with a first node in a copper network using a twelfth pin, a thirteenth pin, an eighteenth pin, and a nineteenth pin of the twenty pins; and
 establishing a second connection with a second node in the copper network using the sixth pin, a seventh pin, a ninth pin, and a tenth pin of the twenty pins.

6. The method of claim 4, wherein the filter comprises a low pass filter.

7. The method of claim 4, wherein the module detection signal and the first data signal are received simultaneously at the sixth pin.

8. An apparatus comprising:
 a receptacle formed to receive a dual channel small form-factor pluggable (SFP) module and to direct the dual channel SPF module towards a first connector comprising twenty pins;
 a first interface coupled to a first node in a copper network using a twelfth pin, a thirteenth pin, an eighteenth pin, and a nineteenth pin of the twenty pins; and
 a second interface coupled to a second node in the copper network using a sixth pin, a seventh pin, a ninth pin, and a tenth pin of the twenty pins.

9. The apparatus of claim 8, further comprising a low pass filter coupled to the sixth pin of the twenty pins.

* * * * *